United States Patent
Suzuki (10) Patent No.: US 9,605,616 B2
(45) Date of Patent: Mar. 28, 2017

(54) EXHAUST GAS PURIFICATION APPARATUS OF INTERNAL COMBUSTION ENGINE

(71) Applicant: Kotaro Suzuki, Minamiashigara (JP)

(72) Inventor: Kotaro Suzuki, Minamiashigara (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/897,917

(22) PCT Filed: Jul. 11, 2013

(86) PCT No.: PCT/JP2013/069020
§ 371 (c)(1),
(2) Date: Dec. 11, 2015

(87) PCT Pub. No.: WO2015/004779
PCT Pub. Date: Jan. 15, 2015

(65) Prior Publication Data
US 2016/0115891 A1 Apr. 28, 2016

(51) Int. Cl.
*F02D 41/14* (2006.01)
*F01N 3/20* (2006.01)
(Continued)

(52) U.S. Cl.
CPC ..... *F02D 41/1454* (2013.01); *B01D 53/9418* (2013.01); *B01D 53/9495* (2013.01);
(Continued)

(58) Field of Classification Search
CPC ............. F02D 41/1454; F02D 41/0235; F02D 41/1446; B01D 53/9195; F01N 3/2073
(Continued)

(56) References Cited

U.S. PATENT DOCUMENTS

2005/0229900 A1* 10/2005 Weber ................... F01N 3/2073
123/316
2013/0269317 A1* 10/2013 Narayanaswamy ...... F01N 3/20
60/274
(Continued)

FOREIGN PATENT DOCUMENTS

GB 2375059 A 11/2002
JP 2002-235594 A 8/2002
(Continued)

*Primary Examiner* — Patrick Maines
(74) *Attorney, Agent, or Firm* — Andrews Kurth Kenyon LLP (57) ABSTRACT

An exhaust gas purification apparatus of an internal combustion engine includes: an $NH_3$ generating catalyst which generates $NH_3$ from NOx and $H_2$ at a rich air-fuel ratio; an in-cylinder injection valve which injects fuel into a cylinder; and a control apparatus which, when setting a rich air-fuel ratio, sets a timing of fuel injection from the in-cylinder injection valve to a second half of a compression stroke when a temperature of the $NH_3$ generating catalyst is within a first prescribed range and sets a timing f of fuel injection from the in-cylinder injection valve to a first half of an intake stroke when the temperature of the $NH_3$ generating catalyst is within a second prescribed range that is a higher temperature range than the first prescribed range.

6 Claims, 6 Drawing Sheets

(51) Int. Cl.
  *F01N 11/00* (2006.01)
  *F02D 41/02* (2006.01)
  *F02D 41/30* (2006.01)
  *F02D 41/40* (2006.01)
  *B01D 53/94* (2006.01)

(52) U.S. Cl.
  CPC ............ *F01N 3/2073* (2013.01); *F01N 11/00* (2013.01); *F02D 41/0235* (2013.01); *F02D 41/1446* (2013.01); *F02D 41/3094* (2013.01); *F02D 41/401* (2013.01); *B01D 2251/208* (2013.01); *B01D 2251/2062* (2013.01); *F01N 2610/02* (2013.01); *F02D 41/0275* (2013.01); *F02D 2200/0802* (2013.01); *Y02T 10/24* (2013.01); *Y02T 10/44* (2013.01); *Y02T 10/47* (2013.01)

(58) Field of Classification Search
  USPC .......................................................... 60/295
  See application file for complete search history.

(56) References Cited

U.S. PATENT DOCUMENTS

2015/0252709 A1* 9/2015 Sun .................... F01N 3/208
  60/274
2015/0285118 A1* 10/2015 Irisawa ................ F01N 3/0842
  60/285

FOREIGN PATENT DOCUMENTS

| JP | 2002235594 A | * | 8/2002 |
| JP | 2006-009702 A | | 1/2006 |
| JP | 2006009702 A | * | 1/2006 |
| JP | 2006-299886 A | | 11/2006 |
| JP | 2009-215960 A | | 9/2009 |
| JP | 2010-007621 A | | 1/2010 |
| JP | 2012-127295 A | | 7/2012 |

* cited by examiner

EXHAUST GAS PURIFICATION APPARATUS OF INTERNAL COMBUSTION ENGINE

CROSS-REFERENCE TO RELATED APPLICATION

This is a national phase application based on the PCT International Patent Application No. PCT/JP2013/069020 filed Jul. 11, 2013, the entire contents of which are incorporated herein by reference.

TECHNICAL FIELD

The present invention relates to an exhaust gas purification apparatus of an internal combustion engine.

BACKGROUND ART

A technique is known in which a NOx storage reduction catalyst (hereinafter, also referred to as an NSR catalyst) is arranged in an exhaust passage of an internal combustion engine. The NSR catalyst stores NOx in exhaust gas when oxygen concentration of exhaust gas flowing in is high and reduces stored NOx when oxygen concentration of exhaust gas flowing in is low and a reducing agent is present. In addition, a three-way catalyst can also be equipped with functions similar to an NSR catalyst.

Furthermore, a selective catalytic reduction NOx catalyst (hereinafter, also referred to as a SCR catalyst) can be provided on a downstream side of a three-way catalyst or an NSR catalyst. The SCR catalyst is a catalyst that selectively reduces NOx using a reducing agent. At the three-way catalyst or the NSR catalyst, $H_2$ is generated from CO or HC in exhaust gas and, in turn, $NH_3$ is generated from the $H_2$ and NOx. The $NH_3$ is used as a reducing agent at the SCR catalyst. When combustion is performed in the internal combustion engine at a lower air-fuel ratio (rich air-fuel ratio) than a stoichiometric air-fuel ratio, CO or HC can be discharged from the internal combustion engine. If NOx is stored by the three-way catalyst or the NSR catalyst, by operating the internal combustion engine at a rich air-fuel ratio, $NH_3$ generated at the three-way catalyst or the NSR catalyst can be supplied to the SCR catalyst as a reducing agent.

There are known techniques in which, when a reforming catalyst having $H_2$-generating capability is provided on an upstream side of a NSR catalyst and an air-fuel ratio is set to a rich air-fuel ratio in order to reduce NOx stored in the NSR catalyst, the air-fuel ratio is controlled to mainly cause a partial oxidation reaction if a temperature of the reforming catalyst is equal to or lower than a prescribed value, and the air-fuel ratio is controlled to mainly cause a steam reforming reaction or an aqueous gas shift reaction if the temperature of the reforming catalyst is higher than the prescribed value (for example, refer to Patent Document 1).

However, when generating $H_2$ by a steam reforming reaction or an aqueous gas shift reaction, a gas component that can effectively generate $H_2$ differs depending on catalyst temperature. Simply controlling the air-fuel ratio does not guarantee an optimum gas component for generating $H_2$. Therefore, there is room for improvement in increasing efficiency when generating $H_2$ and $NH_3$.

PRIOR ART REFERENCES

Patent Documents

Patent Document 1: Japanese Patent Application Laid-open No. 2002-235594

Patent Document 2: Japanese Patent Application Laid-open No. 2006-299886

Patent Document 3: Japanese Patent Application Laid-open No. 2009-215960

Patent Document 4: Japanese Patent Application Laid-open No. 2006-009702

Patent Document 5: Japanese Patent Application Laid-open No. 2012-127295

Patent Document 6: Japanese Patent Application Laid-open No. 2010-007621

SUMMARY OF THE INVENTION

Problems to be Solved by the Invention

The present invention has been made in consideration of the problem described above and an object thereof is to increase efficiency of $NH_3$ generation.

Means for Solving the Problems

In order to solve the problem described above, an exhaust gas purification apparatus of an internal combustion engine according to the present invention includes:

an $NH_3$ generating catalyst which is provided in an exhaust passage of the internal combustion engine and which generates $NH_3$ from NOx and $H_2$ when an air-fuel ratio of exhaust gas is lower than a stoichiometric air-fuel ratio;

a detecting unit which detects a temperature of the $NH_3$ generating catalyst;

an in-cylinder injection valve which injects fuel into a cylinder of the internal combustion engine; and a control apparatus which sets the air-fuel ratio of exhaust gas lower than the stoichiometric air-fuel ratio to generate $NH_3$ by the $NH_3$ generating catalyst, wherein the control apparatus, when setting the air-fuel ratio of exhaust gas lower than the stoichiometric air-fuel ratio, sets a timing of fuel injection from the in-cylinder injection valve to a second half of a compression stroke in a case where the temperature of the $NH_3$ generating catalyst as detected by the detecting unit is within a first prescribed range and sets a timing of fuel injection from the in-cylinder injection valve to a first half of an intake stroke in a case where the temperature of the $NH_3$ generating catalyst as detected by the detecting unit is within a second prescribed range that is a higher temperature range than the first prescribed range.

An $NH_3$ generating catalyst is a catalyst that generates $NH_3$ by, for example, causing $H_2$ and NO to react. The $NH_3$ is generated when an air-fuel ratio of exhaust gas is a rich air-fuel ratio. For example, a three-way catalyst or a NOx storage reduction catalyst (NSR catalyst) can be adopted as the $NH_3$ generating catalyst. The $NH_3$ generating catalyst need only be equipped with a function of storing NOx, and NOx may be stored in any state such as storage, adsorption, and adhesion. Moreover, the following description will be given on the assumption that the $NH_3$ generating catalyst stores NOx. In addition, at the $NH_3$ generating catalyst, stored NOx is released at a rich air-fuel ratio and $NH_3$ is generated from the released NOx.

In this case, at the $NH_3$ generating catalyst, due to an aqueous gas shift reaction or a steam reforming reaction, CO or HC in exhaust gas reacts with $H_2O$ in exhaust gas to generate $H_2$. The $H_2$ reacts with NO to generate $NH_3$. An aqueous gas shift reaction and a steam reforming reaction have different temperatures at which the reactions become active. Specifically, an aqueous gas shift reaction becomes active at a lower temperature than a steam reforming reaction.

With an aqueous gas shift reaction, $H_2$ can be generated from CO and $H_2O$. In addition, with a steam reforming reaction, $H_2$ can be generated from HC and $H_2O$. Therefore, when the temperature of the $NH_3$ catalyst is within a temperature range in which an aqueous gas shift reaction becomes active, a larger amount of $H_2$ can be generated by supplying CO to the $NH_3$ generating catalyst. In addition, when the temperature of $NH_3$ is within a temperature range in which a steam reforming reaction becomes active, a larger amount of $H_2$ can be generated by supplying HC to the $NH_3$ generating catalyst. Therefore, the first prescribed range may be set to a range in which an aqueous gas shift reaction becomes active and the second prescribed range may be set to a range in which a steam reforming reaction becomes active. For example, the first prescribed range and the second prescribed range may be adopted as temperature ranges in which an amount of generated $H_2$ equals or exceeds a prescribed amount.

In addition, by adjusting a timing of fuel injection from the in-cylinder injection valve, respective generated amounts of CO and HC can be adjusted. In this case, by setting the timing of fuel injection from the in-cylinder injection valve to a second half of a compression stroke, an air-fuel mixture with an insufficient mix of fuel and air is generated. Accordingly, a larger amount of CO can be generated. Therefore, when the temperature of the $NH_3$ generating catalyst is relatively low, by injecting fuel from the in-cylinder injection valve in the second half of a compression stroke to increase an amount of generated CO, an aqueous gas shift reaction at the $NH_3$ generating catalyst can be promoted. Accordingly, a larger amount of $NH_3$ can be generated.

On the other hand, by setting the timing of fuel injection from the in-cylinder injection valve to a first half of an intake stroke, fuel enters a narrow range enclosed by a wall surface of the cylinder and a piston. Such fuel is less combustible. As a result, a larger amount of HC can be generated. Therefore, when the temperature of the $NH_3$ generating catalyst is relatively high, by injecting fuel from the in-cylinder injection valve in the first half of an intake stroke to increase an amount of generated HC, a steam reforming reaction at the $NH_3$ generating catalyst can be promoted. Accordingly, a larger amount of $NH_3$ can be generated.

In the present invention, an in-passage injection valve which injects fuel into an intake passage of the internal combustion engine may be provided, and when setting the air-fuel ratio of exhaust gas lower than the stoichiometric air-fuel ratio, the control apparatus may set an amount of fuel injection from the in-passage injection valve to an amount of fuel injection necessary for the air-fuel ratio to drop to the stoichiometric air-fuel ratio and may set an amount of fuel injection from the in-cylinder injection valve to an amount of fuel injection necessary for the air-fuel ratio to drop from the stoichiometric air-fuel ratio to a targeted rich air-fuel ratio.

In this case, when a concentration of an air-fuel mixture in the cylinder is not uniform, even if fuel is supplied in order to realize a rich air-fuel ratio, oxygen may remain in exhaust gas. The oxygen reacts with HC or CO at the $NH_3$ generating catalyst. As a result, since HC or CO for generating $H_2$ decreases, $NH_3$ generation efficiency declines. Supplying fuel from the in-passage injection valve is more effective than supplying fuel from the in-cylinder injection valve for realizing a uniform concentration of an air-fuel mixture in the cylinder. Therefore, by setting the amount of fuel injection from the in-cylinder injection valve to an amount of fuel injection necessary for the air-fuel ratio to drop to the stoichiometric air-fuel ratio, an amount of oxygen remaining in exhaust gas can be reduced. In addition, by setting the amount of fuel injection from the in-cylinder injection valve to an amount of fuel injection necessary for the air-fuel ratio to drop from the stoichiometric air-fuel ratio to a targeted rich air-fuel ratio, CO or HC can be generated. Moreover, the targeted rich air-fuel ratio may be set to an air-fuel ratio suitable for $NH_3$ generation or to an air-fuel ratio suitable for causing oxygen to be released from the $NH_3$ generating catalyst.

In the present invention, a selective catalytic reduction NOx catalyst, which reduces NOx by using $NH_3$ as a reducing agent, can be provided in the exhaust passage on a downstream side of the $NH_3$ generating catalyst.

A selective catalytic reduction NOx catalyst (SCR catalyst) adsorbs $NH_3$ generated at the $NH_3$ generating catalyst and reduces NOx using the $NH_3$. By providing the SCR catalyst in the exhaust passage on a downstream side of the $NH_3$ generating catalyst, the air-fuel ratio of exhaust gas can be set lower than the stoichiometric air-fuel ratio and a reducing agent can be supplied to the SCR catalyst.

In addition, in the present invention, when setting the air-fuel ratio of exhaust gas lower than the stoichiometric air-fuel ratio, the control apparatus can:

set the air-fuel ratio of exhaust gas lower than the stoichiometric air-fuel ratio by setting the timing of fuel injection from the in-cylinder injection valve to a second half of a compression stroke in a first prescribed period;

set the air-fuel ratio of exhaust gas lower than the stoichiometric air-fuel ratio by setting the timing of fuel injection from the in-cylinder injection valve to a second half of a compression stroke in a second prescribed period that is a period subsequent to the first prescribed period and, at the same time, when the temperature of the $NH_3$ generating catalyst as detected by the detecting unit is within a first prescribed range; and set the air-fuel ratio of exhaust gas lower than the stoichiometric air-fuel ratio by setting the timing of fuel injection from the in-cylinder injection valve to a first half of an intake stroke in the second prescribed period and, at the same time, when the temperature of the $NH_3$ generating catalyst as detected by the detecting unit is within a second prescribed range that is a higher temperature range than the first prescribed range.

In this case, by setting the timing of fuel injection from the in-cylinder injection valve to a second half of a compression stroke in a first prescribed period, a larger amount of CO can be generated. CO has higher reactivity than HC. Therefore, $NH_3$ can be generated at a faster rate.

Moreover, an air-fuel ratio of exhaust gas in the first prescribed period may be lower than an air-fuel ratio of exhaust gas in the second prescribed period.

Furthermore, in the present invention, a catalyst which is provided in the exhaust passage on an upstream side of the $NH_3$ generating catalyst and which has oxygen storage capability and a gas sensor which is provided in the exhaust passage on a downstream side of the catalyst with oxygen storage capability and an upstream side of the $NH_3$ generating catalyst and which detects an air-fuel ratio of exhaust gas may be further provided, wherein the first prescribed period may at least be a period from when an air-fuel ratio of exhaust gas on an upstream side of the catalyst with oxygen storage capability drops to below the stoichiometric air-fuel ratio to when the air-fuel ratio of exhaust gas as detected by the gas sensor drops to a rich air-fuel ratio that is lower than the stoichiometric air-fuel ratio.

In a case where a catalyst with oxygen storage capability is provided on an upstream side of the $NH_3$ generating catalyst, when the air-fuel ratio of exhaust gas becomes rich, oxygen stored by the $NH_3$ generating catalyst is released. Subsequently, due to the oxygen, the air-fuel ratio of exhaust gas equals the stoichiometric air-fuel ratio. In other words, the air-fuel ratio of exhaust gas as detected by the gas sensor equals the stoichiometric air-fuel ratio. In addition, once release of oxygen from the catalyst with oxygen storage capability ends, the air-fuel ratio of exhaust gas as detected by the gas sensor becomes a rich air-fuel ratio. At the same time, once release of oxygen from the catalyst with oxygen storage capability ends, generation of $NH_3$ is started. A period during which oxygen is stored by the catalyst with oxygen storage capability can be adopted as the first prescribed period. Alternatively, a period during which oxygen is released from the catalyst with oxygen storage capability may be adopted as the first prescribed period. In addition, a period during which $NH_3$ is generated at the $NH_3$ generating catalyst may be adopted as the second prescribed period.

When the air-fuel ratio of exhaust gas equals the stoichiometric air-fuel ratio due to oxygen released from the catalyst with oxygen storage capability, $NH_3$ is not generated at the $NH_3$ generating catalyst. Therefore, by causing oxygen to be quickly released from the catalyst with oxygen storage capability, a timing when $NH_3$ generation is started at the $NH_3$ generating catalyst can be hastened. In this case, by setting the timing of fuel injection from the in-cylinder injection valve to a second half of a compression stroke, a larger amount of CO can be generated. Since CO has higher reactivity than HC, release of oxygen from the catalyst with oxygen storage capability can be facilitated. Accordingly, since oxygen can be quickly released from the catalyst with oxygen storage capability, fuel necessary for generating $NH_3$ can be reduced and the time required to generate $NH_3$ can also be reduced.

Alternatively, the catalyst with oxygen storage capability may be a three-way catalyst. In addition, the catalyst with oxygen storage capability may be a $NH_3$ generating catalyst. In this case, $NH_3$ generating catalysts are to be provided in series. Furthermore, the air-fuel ratio of exhaust gas on an upstream side of the catalyst with oxygen storage capability may be detected by a sensor or may be estimated based on an intake air amount and a fuel supply amount of the internal combustion engine.

Effect of the Invention

According to the present invention, efficiency of $NH_3$ generation can be increased.

MODES FOR CARRYING OUT THE INVENTION

Hereinafter, modes for implementing the invention will be described in detail by way of example of embodiments with reference to the drawings. However, it is to be understood that dimensions, materials, shapes, relative arrangements, and the like of components described in the embodiments are not intended to limit the scope of the invention thereto unless otherwise noted.

[First Embodiment]

Figure 1:
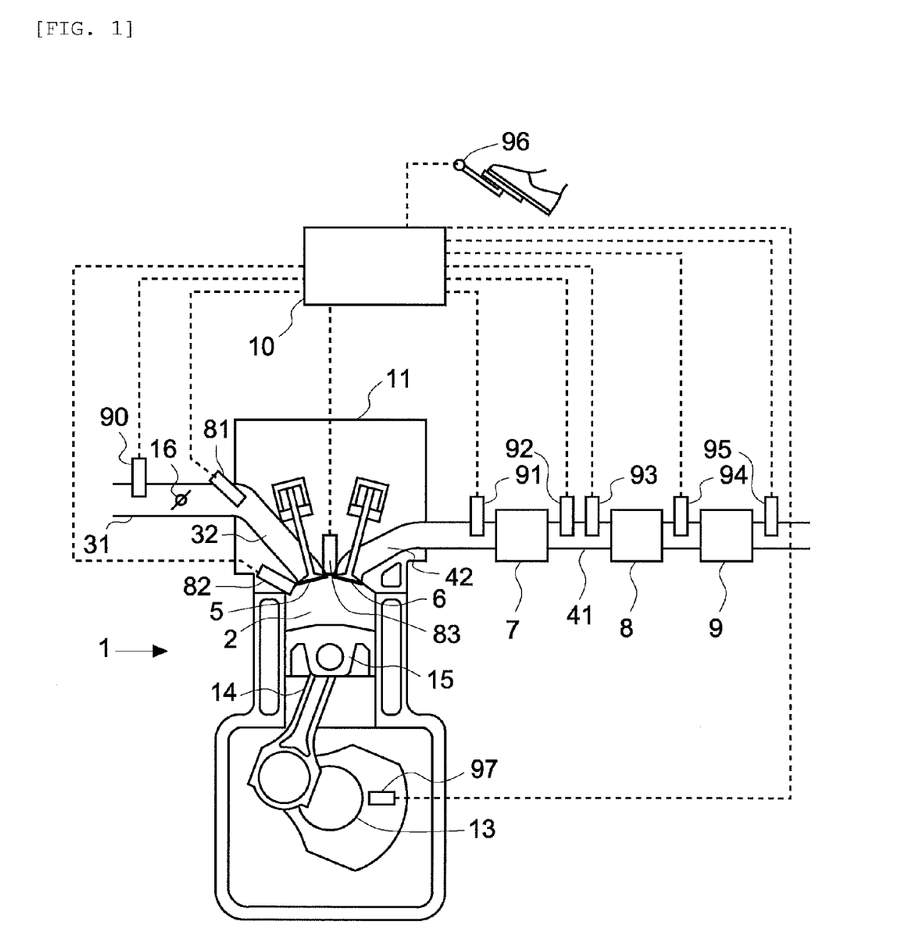
FIG. 1 is a diagram representing a schematic configuration of an internal combustion engine according to an embodiment.

FIG. 1 is a diagram representing a schematic configuration of an internal combustion engine 1 according to the present embodiment. It should be noted that display of some of the components in the present embodiment have been omitted to display an internal combustion engine 1 in a simple manner. The internal combustion engine 1 is a gasoline engine having four cylinders 2.

An intake pipe 31 and an exhaust pipe 41 are connected to a cylinder head 11 of the internal combustion engine 1. An intake port 32 communicating the intake pipe 31 to the inside of the cylinder 2 and an exhaust port 42 communicating the exhaust pipe 41 to the inside of the cylinder 2 are formed in the cylinder head 11. An intake valve 5 is provided on an end of the intake port 32 on the side of the cylinder 2. In addition, an exhaust valve 6 is provided on an end of the exhaust port 42 on the side of the cylinder 2. Moreover, in the present embodiment, the intake pipe 31 and the intake port 32 correspond to the intake passage according to the present invention and the exhaust pipe 41 and the exhaust port 42 correspond to the exhaust passage according to the present invention.

In addition, a piston 15 that is coupled to a crankshaft 13 of the internal combustion engine 1 via a connecting rod 14 reciprocates inside the cylinder 2.

Furthermore, a throttle 16 that adjusts an amount of intake air flowing through the intake pipe 31 is provided in the intake pipe 31. An air flow meter 90 that outputs a signal in accordance with an amount of air flowing inside the intake pipe 31 is provided in the intake pipe 31 on an upstream side of the throttle 16. An intake air amount of the internal combustion engine 1 is detected by the air flow meter 90.

A three-way catalyst 7, a NOx storage reduction catalyst 8 (hereinafter, referred to as an NSR catalyst 8), and a selective catalytic reduction NOx catalyst 9 (hereinafter, referred to as an SCR catalyst 9) are provided midway along the exhaust pipe 41 in this order from an upstream side.

The three-way catalyst 7 purifies NOx, HC, and CO at maximum efficiency when a catalyst atmosphere is at a stoichiometric air-fuel ratio. In addition, the three-way catalyst 7 has oxygen storage capability. In other words, the three-way catalyst 7 purifies exhaust gas by storing excess oxygen when an air-fuel ratio of exhaust gas flowing in is a lean air-fuel ratio and by releasing insufficient oxygen when the air-fuel ratio of exhaust gas flowing in is a rich air-fuel ratio. Due to such actions realized by the oxygen storage capability, the three-way catalyst 7 can purify HC, CO, and NOx even when not at the stoichiometric air-fuel ratio.

Moreover, a NOx storage reduction catalyst that is the same as the NSR catalyst 8 may be arranged in place of the three-way catalyst 7.

In addition, the NSR catalyst 8 stores NOx in exhaust gas when oxygen concentration of exhaust gas flowing in is high and reduces stored NOx when oxygen concentration of exhaust gas flowing in is low and a reducing agent is present. As the reducing agent to be supplied to the NSR catalyst 8, HC or CO that is unburned fuel discharged from the internal combustion engine 1 can be used. The NSR catalyst 8 also has oxygen storage capability.

When exhaust gas passes through the three-way catalyst 7 or the NSR catalyst 8, NOx in the exhaust gas may react with HC or $H_2$ to generate ammonia ($NH_3$). For example, when CO or HC in exhaust gas reacts with $H_2O$ in the exhaust gas and $H_2$ is generated due to an aqueous gas shift reaction or a steam reforming reaction at the three-way catalyst 7 or the NSR catalyst 8, the $H_2$ reacts with NO to generate $NH_3$. In other words, in the present embodiment, the three-way catalyst 7 or the NSR catalyst 8 corresponds to the $NH_3$ generating catalyst according to the present invention. Moreover, while the NSR catalyst 8 will be described as an $NH_3$ generating catalyst in the present embodiment, the three-way catalyst 7 can be considered as an $NH_3$ generating catalyst in a similar manner.

The SCR catalyst 9 adsorbs the reducing agent, and when NOx passes through the SCR catalyst 9, the SCR catalyst 9 selectively reduces NOx using the adsorbed reducing agent. $NH_3$ generated at the NSR catalyst 8 can be used as the reducing agent to be supplied to the SCR catalyst 9.

In addition, a first air-fuel ratio sensor 91 that detects an air-fuel ratio of exhaust gas is attached to the exhaust pipe 41 on an upstream side of the three-way catalyst 7. Furthermore, a first temperature sensor 92 that detects a temperature of exhaust gas and a second air-fuel ratio sensor 93 that detects an air-fuel ratio of exhaust gas are attached to the exhaust pipe 41 on a downstream side of the three-way catalyst 7 and an upstream side of the NSR catalyst 8. Due to the first air-fuel ratio sensor 91, an air-fuel ratio of exhaust gas from the internal combustion engine 1 or an air-fuel ratio of exhaust gas flowing into the three-way catalyst 7 can be detected. Moreover, the air-fuel ratio of exhaust gas from the internal combustion engine 1 or the air-fuel ratio of exhaust gas flowing into the three-way catalyst 7 can also be estimated based on an intake air amount and a fuel supply amount of the internal combustion engine 1. In addition, due to the first temperature sensor 92, a temperature of the three-way catalyst 7 or a temperature of the NSR catalyst 8 can be detected. Furthermore, due to the second air-fuel ratio sensor 93, an air-fuel ratio of exhaust gas flowing out from the three-way catalyst 7 or an air-fuel ratio of exhaust gas flowing into the NSR catalyst 8 can be detected. An oxygen concentration sensor may be adopted as the second air-fuel ratio sensor 93. Moreover, in the present invention, the second air-fuel ratio sensor 93 corresponds to the gas sensor according to the present invention.

Furthermore, a second temperature sensor 94 that detects a temperature of exhaust gas is attached to the exhaust pipe 41 on a downstream side of the NSR catalyst 8 and an upstream side of the SCR catalyst 9. Due to the second temperature sensor 94, a temperature of the NSR catalyst 8 or a temperature of the SCR catalyst 9 can be detected.

In addition, a third temperature sensor 95 that detects a temperature of exhaust gas is attached to the exhaust pipe 41 on a downstream side of the SCR catalyst 9. Due to the third temperature sensor 95, a temperature of the SCR catalyst 9 can be detected. In other words, in the present embodiment, the second temperature sensor 94 or the third temperature sensor 95 corresponds to the detecting unit according to the present invention. Moreover, since temperatures of the three-way catalyst 7, the NSR catalyst 8, and the SCR catalyst 9 change in accordance with an operating state (for example, an engine rotational speed and an engine load) of the internal combustion engine 1, temperatures of the three-way catalyst 7, the NSR catalyst 8, and the SCR catalyst 9 may be estimated in accordance with an operating state of the internal combustion engine 1. Alternatively, temperature sensors may be directly attached to the three-way catalyst 7, the NSR catalyst 8, and the SCR catalyst 9 to detect temperatures of the three-way catalyst 7, the NSR catalyst 8, and the SCR catalyst 9. Moreover, all of the sensors described above need not necessarily be attached and may be selectively attached as appropriate.

Furthermore, an in-passage injection valve 81 that injects fuel toward the intake pipe 31 or the intake port 32 is attached to the intake pipe 31 on a downstream side of the throttle 16. In addition, an in-cylinder injection valve 82 that injects fuel into the cylinder 2 is attached to the internal combustion engine 1. Furthermore, a spark plug 83 that generates an electric spark inside the cylinder 2 is attached to the internal combustion engine 1.

In addition, the internal combustion engine 1 is provided with an ECU 10 that is an electronic control device for controlling the internal combustion engine 1. The ECU 10 includes a CPU as well as a ROM, a RAM, and the like which store various programs and maps, and controls the internal combustion engine 1 in accordance with an operating condition of the internal combustion engine 1 or in response to a request from a driver.

In addition to the various sensors described above, an accelerator depression amount sensor 96 and a crank position sensor 97 are electrically connected to the ECU 10. The ECU 10 receives a signal in accordance with an accelerator depression amount from the accelerator depression amount sensor 96 and calculates an engine load or the like that is required by the internal combustion engine 1 in accordance with the signal. In addition, the ECU 10 receives a signal in accordance with a rotational angle of the crankshaft 13 of the internal combustion engine 1 from the crank position sensor 97 and calculates an engine rotational speed.

Meanwhile, the in-passage injection valve 81, the in-cylinder injection valve 82, and the spark plug 83 are connected via electric wiring to the ECU 10 and are controlled by the ECU 10.

For example, the ECU 10 controls the in-passage injection valve 81 and the in-cylinder injection valve 82 so that fuel in accordance with an intake air amount detected by the air flow meter 90 is supplied. A target air-fuel ratio set at this point is an air-fuel ratio that is set in accordance with an operating state of the internal combustion engine 1. Moreover, a lean burn operation is performed by the internal combustion engine 1 according to the present embodiment. However, during a high-load operation or the like, the internal combustion engine 1 may be operated in a vicinity of the stoichiometric air-fuel ratio. In addition, the internal combustion engine 1 may be operated at a lower air-fuel ratio (a rich air-fuel ratio) than the stoichiometric air-fuel ratio in order to generate $NH_3$ or to reduce NOx.

Furthermore, the ECU 10 performs a reduction process of NOx stored in the NSR catalyst 8. When reducing NOx stored in the NSR catalyst 8, by adjusting an amount of fuel injected from the in-passage injection valve 81 and the in-cylinder injection valve 82 or adjusting an amount of opening of the throttle 16, a so-called rich spike is performed in which an air-fuel ratio of exhaust gas flowing into the NSR catalyst 8 is dropped to a prescribed rich air-fuel ratio. With the rich spike according to the present embodiment, the air-fuel ratio of exhaust gas flowing into the NSR catalyst 8 is set to a prescribed rich air-fuel ratio by setting an air-fuel ratio in the cylinder 2 to the prescribed rich air-fuel ratio in a plurality of cycles.

The rich spike is performed when an amount of NOx stored in the NSR catalyst 8 reaches a prescribed amount. The amount of NOx stored in the NSR catalyst 8 is calculated by, for example, integrating a difference between an amount of NOx flowing into the NSR catalyst 8 and an amount of NOx flowing out from the NSR catalyst 8. The amount of NOx flowing into the NSR catalyst 8 and the amount of NOx flowing out from the NSR catalyst 8 can be detected by attaching sensors. Alternatively, a rich spike may be performed for each prescribed time or for each prescribed travel distance.

In addition, by performing a rich spike, the ECU 10 causes $NH_3$ to be generated at the NSR catalyst 8. The rich spike is performed when an amount of $NH_3$ adsorbed by the SCR catalyst 9 decreases to a prescribed amount. Since the amount of $NH_3$ adsorbed by the SCR catalyst 9 decreases in accordance with, for example, an amount of NOx flowing into the SCR catalyst 9, the amount of $NH_3$ adsorbed by the SCR catalyst 9 can be calculated by detecting the amount of NOx flowing into the SCR catalyst 9 using a sensor or the like. Alternatively, a rich spike for generating $NH_3$ may be performed at prescribed intervals.

In this case, when a rich spike is performed in order to generate $NH_3$ at the NSR catalyst 8, CO or HC is discharged from the internal combustion engine 1. The CO or HC reacts with $H_2O$ in exhaust gas due to an aqueous gas shift reaction or a steam reforming reaction and, as a result, $H_2$ is generated. $NH_3$ is generated as a result of a reaction between $H_2$ generated in this manner and NOx released from the NSR catalyst 8. The $NH_3$ is adsorbed by the SCR catalyst 9 on a downstream side and is used by the SCR catalyst 9 as a reducing agent for reducing NOx.

With an aqueous gas shift reaction, $H_2$ can be generated from CO and $H_2O$. In addition, with a steam reforming reaction, $H_2$ can be generated from HC and $H_2O$. Furthermore, an aqueous gas shift reaction and a steam reforming reaction have different temperatures at which the reactions become active. In other words, temperatures at which an amount of generated $H_2$ reaches maximum differ between an aqueous gas shift reaction and a steam reforming reaction. Specifically, an aqueous gas shift reaction becomes active in a lower temperature region than a steam reforming reaction.

Figure 2:
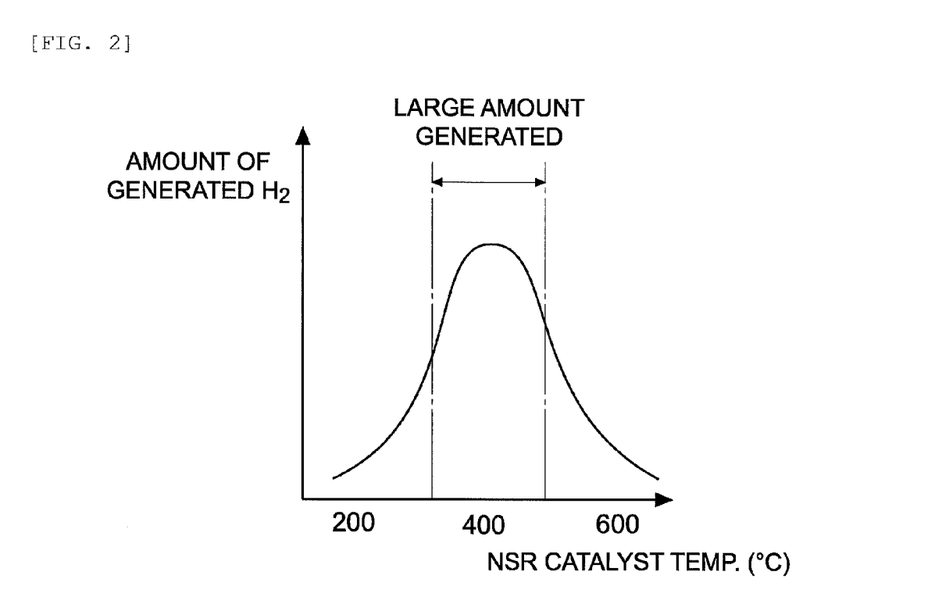
FIG. 2 is a diagram showing a relationship between a temperature of an NSR catalyst and an amount of generated $H_2$ in an aqueous gas shift reaction.
Figure 3:
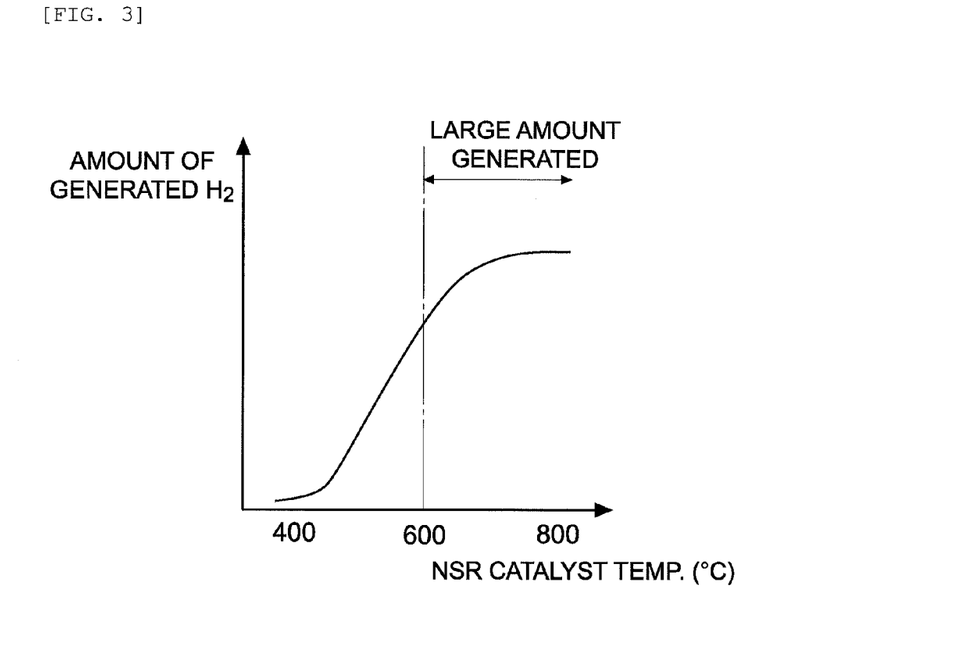
FIG. 3 is a diagram showing a relationship between a temperature of an NSR catalyst and an amount of generated $H_2$ in a steam reforming reaction.

FIG. 2 is a diagram showing a relationship between a temperature of the NSR catalyst 8 and an amount of generated $H_2$ in an aqueous gas shift reaction. In an aqueous gas shift reaction, the amount of generated $NH_3$ relatively increases when the temperature of the NSR catalyst 8 is, for example, around 400° C. In addition, FIG. 3 is a diagram showing a relationship between a temperature of the NSR catalyst 8 and an amount of generated $H_2$ in a steam reforming reaction. In a steam reforming reaction, the amount of generated $H_2$ relatively increases when the temperature of the NSR catalyst 8 is, for example, equal to or higher than 600° C.

Therefore, a larger amount of $NH_3$ can be efficiently generated by increasing CO concentration and generating $NH_3$ by an aqueous gas shift reaction when the temperature of the NSR catalyst 8 is around 400° C., or by increasing HC concentration and generating $NH_3$ by a steam reforming reaction when the temperature of the NSR catalyst 8 is equal to or higher than 600° C.

For example, when the temperature of the NSR catalyst 8 is equal to or lower than a prescribed temperature, CO concentration may be increased to generate $NH_3$ by an aqueous gas shift reaction. On the other hand, when the temperature of the NSR catalyst 8 is higher than the prescribed temperature, HC concentration may be increased to generate $NH_3$ by a steam reforming reaction. In this case, the prescribed temperature is a temperature at which an amount of $H_2$ generated by an aqueous gas shift reaction and an amount of $H_2$ generated by a steam reforming reaction are reversed. The prescribed temperature is determined by comparing FIGS. 2 and 3 with each other and may be set to a temperature between, for example, 500° C. and 600° C.

Moreover, in the present embodiment, a temperature range equal to or lower than the prescribed temperature corresponds to the first prescribed range according to the present invention, and a temperature range higher than the second prescribed temperature corresponds to the second prescribed range according to the present invention.

In addition, in the present embodiment, fuel may be injected from the in-cylinder injection valve 82 in the second half of a compression stroke only at a temperature at which the amount of $H_2$ generated due to an aqueous gas shift reaction is equal to or greater than a prescribed amount. In this case, a temperature range in which the amount of generated $H_2$ is equal to or greater than a prescribed amount corresponds to the first prescribed range according to the present invention. On the other hand, fuel may be injected from the in-cylinder injection valve 82 in the first half of an intake stroke only at a temperature at which the amount of $H_2$ generated due to a steam reforming reaction is equal to or greater than a prescribed amount. In this case, a temperature range in which the amount of generated $H_2$ is equal to or greater than the prescribed amount corresponds to the second prescribed range according to the present invention. An amount of generated $H_2$ that causes $NH_3$ generation efficiency or an amount of generated $NH_3$ to be within an allowable range may be adopted as the prescribed amount.

As described above, by adjusting an amount of CO or HC discharged from the internal combustion engine 1 in accordance with a temperature of the NSR catalyst 8, an amount of $H_2$ generated at the NSR catalyst 8 can be increased. By increasing the amount of generated $H_2$ in this manner, an amount of generated $NH_3$ can be increased. In addition, by adjusting a timing of fuel injection from the in-cylinder injection valve 82, an amount of CO or an amount of HC that is discharged from the internal combustion engine 1 can be increased.

In this case, in order to increase the amount of CO discharged from the internal combustion engine 1 during a rich spike, fuel may be injected from the in-cylinder injection valve 82 in the second half of a compression stroke. On the other hand, in order to increase the amount of HC discharged from the internal combustion engine 1 during a rich spike, fuel may be injected from the in-cylinder injection valve 82 in the first half of an intake stroke.

Alternatively, during a rich spike, an entire amount of fuel necessary to realize a target air-fuel ratio may be injected from the in-cylinder injection valve 82. In addition, during a rich spike, a fuel amount necessary to lower an air-fuel ratio to a vicinity of the stoichiometric air-fuel ratio may be injected from the in-passage injection valve 81 and a fuel amount necessary to lower an air-fuel ratio from the stoichiometric air-fuel ratio to a target air-fuel ratio may be injected from the in-cylinder injection valve 82.

Figure 4:
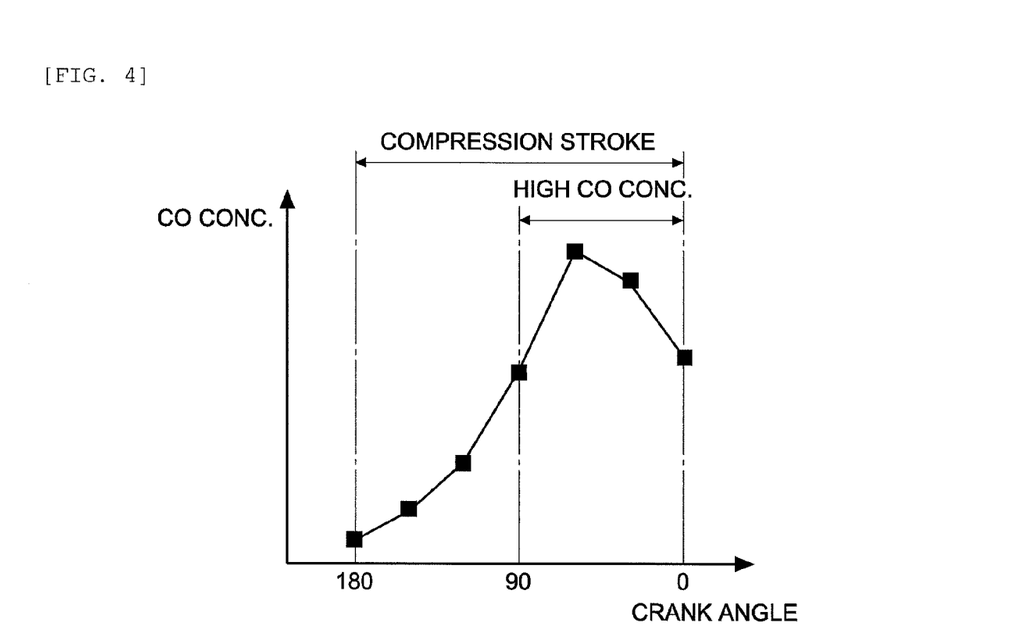
FIG. 4 is a diagram showing a relationship between a timing when fuel is injected from an in-cylinder injection valve and CO concentration in exhaust gas.

FIG. 4 is a diagram showing a relationship between a timing when fuel is injected from the in-cylinder injection valve 82 and CO concentration in exhaust gas. With a numerical value of a crank angle, a compression top dead center is used as a reference and has a numerical value of 0 degrees. In addition, respective numerical values indicate crank angles up to the compression top dead center. In other words, a compression stroke is from 180 degrees to 0 degrees.

It is shown that, by injecting fuel from the in-cylinder injection valve 82 when the crank angle is between 90 degrees and 0 degrees before the compression top dead center or, in other words, during the second half of a compression stroke, CO concentration relatively increases. In this case, by performing fuel injection in the second half of a compression stroke, CO concentration increases due to generation of an air-fuel mixture with an insufficient mix of fuel and air. Therefore, when the temperature of the NSR catalyst 8 is relatively low, by injecting fuel from the in-cylinder injection valve 82 in the second half of a compression stroke to increase CO concentration in exhaust gas, an aqueous gas shift reaction at the NSR catalyst 8 can be promoted. Accordingly, a larger amount of $NH_3$ can be generated.

Figure 5:
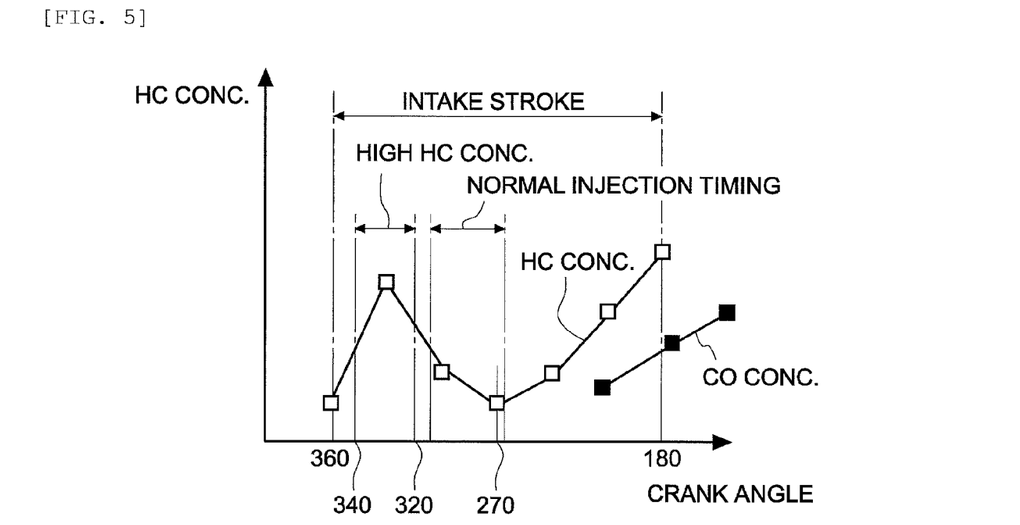
FIG. 5 is a diagram showing a relationship between a timing when fuel is injected from an in-cylinder injection valve and HC concentration in exhaust gas.

In addition, FIG. 5 is a diagram showing a relationship between a timing when fuel is injected from the in-cylinder injection valve 82 and HC concentration in exhaust gas. With a numerical value of a crank angle, a compression top dead center is used as a reference and has a numerical value of 0 degrees. In addition, respective numerical values indicate crank angles up to the compression top dead center. In other words, an intake stroke is from 360 degrees to 180 degrees.

It is shown that, by injecting fuel from the in-cylinder injection valve 82 when the crank angle is between 360 degrees and 270 degrees or, in other words, during the first half of an intake stroke, HC concentration relatively increases. In addition, HC concentration can be further increased by injecting fuel when the crank angle is between 340 degrees and 320 degrees. Alternatively, fuel may be injected from the in-cylinder injection valve 82 during a period in which HC concentration becomes equal to or higher than a prescribed concentration.

Moreover, a normal injection timing in FIG. 5 refers to a timing of fuel injection when a rich spike is not performed. In addition, by advancing the timing of fuel injection from the in-cylinder injection valve 82 as compared to the normal injection timing, HC concentration increases. Moreover, when increasing CO concentration, the timing of fuel injection from the in-cylinder injection valve 82 is delayed as compared to the normal injection timing.

Figure 6:
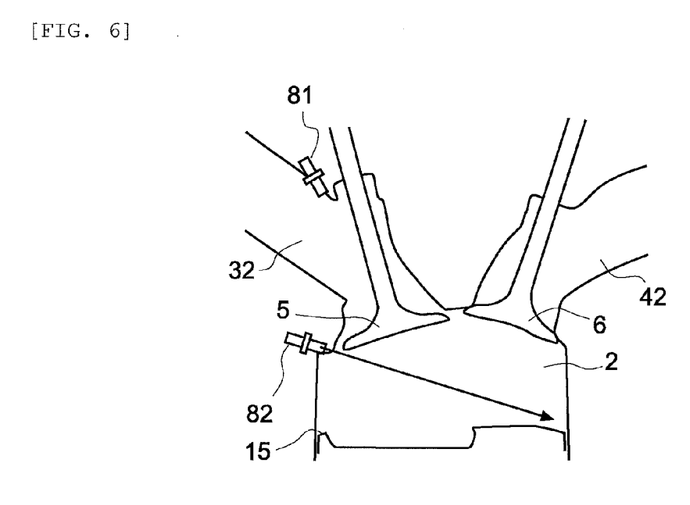
FIG. 6 is a sectional view of an internal combustion engine when performing fuel injection from an in-cylinder injection valve in a first half of an intake stroke.

FIG. 6 is a sectional view of the internal combustion engine 1 when performing fuel injection from the in-cylinder injection valve 82 in a first half of an intake stroke. By performing fuel injection in the first half of an intake stroke, fuel strikes a narrow range enclosed by a wall surface of the cylinder 2 and an outer circumferential surface of the piston 15. Due to low temperature of the range, fuel is less likely to evaporate in the range. In addition, since flames are less likely to reach the range, fuel having entered this range is less likely to burn. In other words, by performing fuel injection so that fuel enters the range enclosed by the wall surface of the cylinder 2 and the outer circumferential surface of the piston 15, HC concentration can be increased. In addition, in order to cause fuel to enter the range enclosed by the wall surface of the cylinder 2 and the outer circumferential surface of the piston 15, fuel may be injected from the in-cylinder injection valve 82 in the first half of an intake stroke. Therefore, when the temperature of the NSR catalyst 8 is relatively high, by injecting fuel from the in-cylinder injection valve 82 in the first half of an intake stroke to increase HC concentration in exhaust gas, a steam reforming reaction at the NSR catalyst 8 can be promoted. Accordingly, a larger amount of $NH_3$ can be generated.

Moreover, while HC concentration is also higher when the crank angle is around 180 degrees in FIG. 5, CO concentration is also higher at this point. Since an aqueous gas shift reaction is slow when the temperature of the NSR catalyst 8 is relatively high, it is difficult to generate $NH_3$ from CO. In addition, when reaction of CO slows down, there is a risk that CO may be released into the atmosphere. Therefore, in a second half of an intake stroke, an amount of discharged CO is reduced by not injecting fuel from the in-cylinder injection valve 82.

An optimal value of a timing of fuel injection that increases CO concentration or HC concentration can be obtained in advance by an experiment or a simulation. In other words, a timing of fuel injection when CO concentration is highest in the second half of a compression stroke and a timing of fuel injection when HC concentration is highest in the first half of an intake stroke may be respectively obtained, whereby fuel may be injected at these timings or before or after these timings.

In addition, when injecting fuel from the in-cylinder injection valve 82 in the first half of an intake stroke, a timing of fuel injection may be adjusted so that, when injected fuel strikes the wall surface of the cylinder 2, an outer edge of an upper surface of the piston 15 is positioned at a same height as the location struck by the fuel. Since fuel injected from the in-cylinder injection valve 82 reaches the wall surface of the cylinder 2 in a somewhat spread state, there is a certain amount of width to the timing of fuel injection that causes fuel to enter a range enclosed by the wall surface of the cylinder 2 and the piston 15.

In this case, an amount of time required by fuel to reach the wall surface of the cylinder 2 after injection can be calculated based on a distance from the in-cylinder injection valve 82 to the wall surface of the cylinder 2 and a speed of the injected fuel. In addition, a distance traveled by the piston 15 between injection of fuel and the fuel reaching the wall surface of the cylinder 2 can be calculated based on an engine rotational speed. Based on these values, a timing of fuel injection that causes fuel injected from the in-cylinder injection valve 82 to enter a range between the wall surface of the cylinder 2 and the outer circumferential surface of the piston 15 when the fuel strikes the wall surface of the cylinder 2 can also be calculated. This calculation can be performed using known calculation formulas.

Furthermore, in the present embodiment, an air-fuel ratio may be relatively lowered immediately after a start of a rich spike in order to promptly generate $NH_3$ during the rich spike. At this point, when oxygen is stored in the three-way catalyst 7, oxygen is released from the three-way catalyst 7 when gas with a rich air-fuel ratio is discharged from the internal combustion engine 1. Due to the oxygen released from the three-way catalyst 7, an air-fuel ratio of exhaust gas on a downstream side of the three-way catalyst 7 becomes the stoichiometric air-fuel ratio. Therefore, since an air-fuel ratio of exhaust gas flowing into the NSR catalyst 8 becomes the stoichiometric air-fuel ratio immediately after the start of a rich spike, $NH_3$ is not generated immediately. In contrast, by performing a rich spike by setting an air-fuel ratio that is further lower than an air-fuel ratio suitable for generating $NH_3$ as a target air-fuel ratio until release of oxygen from the three-way catalyst 7 is completed, oxygen can be swiftly released from the three-way catalyst 7. Accordingly, a timing when generation of $NH_3$ starts at the NSR catalyst 8 can be hastened. Moreover, while the air-fuel ratio of exhaust gas on a downstream side of the three-way catalyst 7 becomes the stoichiometric air-fuel ratio while oxygen is being released from the three-way catalyst 7, the target air-fuel ratio can be set lower than an air-fuel ratio suitable for generating $NH_3$ when the air-fuel ratio of exhaust gas on a downstream side of the three-way catalyst 7 is equal to the stoichiometric air-fuel ratio. Alternatively, the target air-fuel ratio may be set lower than an air-fuel ratio suitable for generating $NH_3$ only for a prescribed period.

In addition, in the present embodiment, fuel injection may be simultaneously performed from the in-passage injection valve 81 during a rich spike. In this case, an amount of fuel injection from the in-passage injection valve 81 may be set to an amount of fuel injection necessary to lower an air-fuel ratio to the stoichiometric air-fuel ratio and an amount of fuel injection from the in-cylinder injection valve 82 may be set to an amount of fuel injection necessary to lower an air-fuel ratio to a target air-fuel ratio from the stoichiometric air-fuel ratio.

Figure 7:
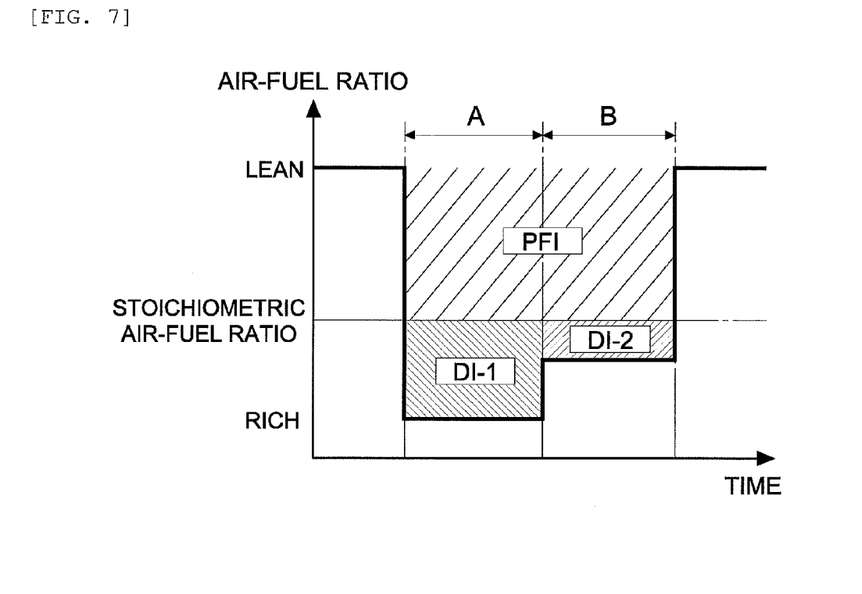
FIG. 7 is a time chart showing a transition of an air-fuel ratio during a rich spike.

FIG. 7 is a time chart showing a transition of an air-fuel ratio during a rich spike. In FIG. 7, "PFI" denotes a drop in an air-fuel ratio due to fuel injected from the in-passage injection valve 81, and "DI-1" and "DI-2" denote drops in an air-fuel ratio due to fuel injected from the in-cylinder injection valve 82. In addition, with "DI-1", fuel is injected in the second half of a compression stroke. Furthermore, with "DI-2", fuel is injected in the first half of an intake stroke or the second half of a compression stroke depending on a temperature of the NSR catalyst 8. A period denoted by A is a period for releasing oxygen stored in the three-way catalyst 7 and a period denoted by B is a period in which $NH_3$ is generated at the NSR catalyst 8. As shown in FIG. 7, while target air-fuel ratios of period A and period B are both rich air-fuel ratios, period A has a lower target air-fuel ratio than period B. Moreover, in the present embodiment, period A corresponds to the first prescribed period according to the present invention and period B corresponds to the second prescribed period according to the present invention.

In this case, if oxygen remains in exhaust gas, CO or HC reacts with oxygen at the three-way catalyst 7. Accordingly, since CO or HC for releasing the oxygen stored in the three-way catalyst 7 decreases, the time until the release of oxygen from the three-way catalyst 7 is completed increases. In addition, subsequent $NH_3$ generation efficiency declines and a larger amount of fuel is to be consumed.

Compared to injecting fuel from the in-cylinder injection valve 82, injecting fuel from the in-passage injection valve 81 promotes diffusion of fuel and causes concentration of an air-fuel mixture inside the cylinder 2 to be more uniform. Therefore, by injecting fuel from the in-passage injection valve 81, an amount of oxygen remaining after combustion can be reduced. In addition, by setting an amount of fuel injection from the in-passage injection valve 81 to equal the stoichiometric air-fuel ratio, the amount of oxygen after combustion can be further reduced. If the amount of fuel injection from the in-passage injection valve 81 is set to a lean air-fuel ratio, there is a risk that oxygen may remain in exhaust gas. On the other hand, when the amount of fuel injection from the in-passage injection valve 81 is set to a rich air-fuel ratio, there is a risk that an amount of generated HC or CO may decrease and an amount of generated $H_2$ may also decrease. Furthermore, by adjusting an air-fuel ratio of an air-fuel mixture inside the cylinder 2 to a rich air-fuel ratio due to an amount of fuel injection from the in-cylinder injection valve 82, the amount of generated HC or CO can be increased. In other words, by using the in-passage injection valve 81 and the in-cylinder injection valve 82 in combination, an amount of CO or HC can be increased while reducing an amount of oxygen remaining in exhaust gas.

Moreover, with DI-1 shown in FIG. 7, fuel is injected from the in-cylinder injection valve 82 in the second half of a compression stroke. This enables a larger amount of CO to be discharged from the internal combustion engine 1. Since CO has higher reactivity than HC, by supplying a larger amount of CO to the three-way catalyst 7, oxygen can be swiftly released.

Figure 8:
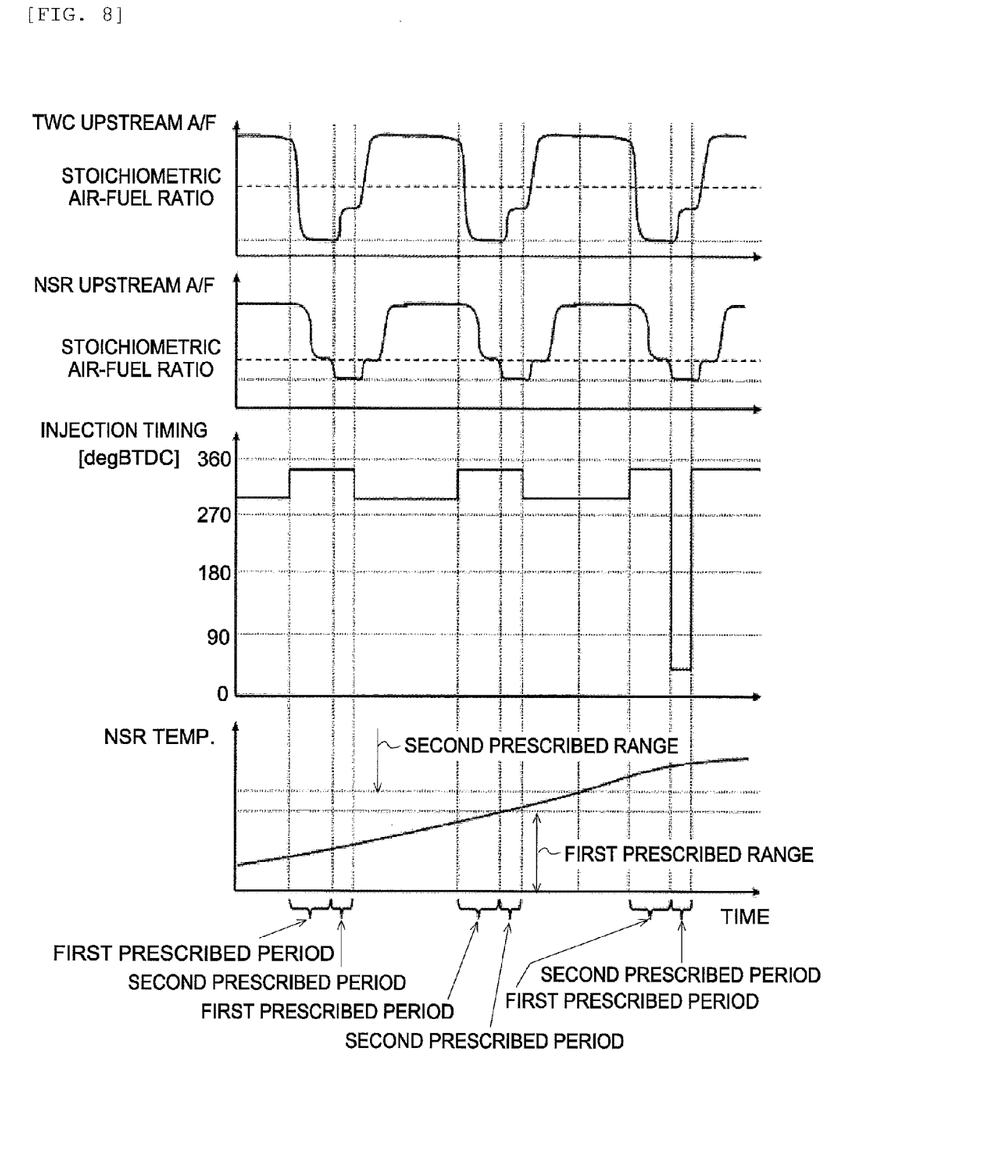
FIG. 8 is a time chart showing transitions of various values when performing a rich spike.

FIG. 8 is a time chart showing transitions of various values when performing a rich spike. "TWC upstream A/F" denotes an air-fuel ratio of exhaust gas on an upstream side of the three-way catalyst 7, "NSR upstream A/F" denotes an air-fuel ratio of exhaust gas on a downstream side of the three-way catalyst 7 and an upstream side of the NSR catalyst 8, "injection timing" denotes a timing of fuel injection from the in-cylinder injection valve 82, and NSR temperature denotes a temperature of the NSR catalyst 8. Moreover, in FIG. 8, a temperature range in which an amount of generated $H_2$ due to an aqueous gas shift reaction equals or exceeds a prescribed amount is assumed to be a first prescribed range. Meanwhile, temperature range in which an amount of generated $H_2$ due to a steam reforming reaction equals or exceeds a prescribed amount is assumed to be a second prescribed range.

While initially within the first prescribed range, the NSR temperature gradually increases and enters the second prescribed range. In addition, when the NSR temperature is within the first prescribed range, the timing of fuel injection from the in-cylinder injection valve 82 is set to the second half of a compression stroke. Furthermore, when the NSR temperature is within the second prescribed range, the timing of fuel injection from the in-cylinder injection valve 82 is set to the first half of a compression stroke during a first prescribed period and set to the first half of an intake stroke during a second prescribed period. When a rich spike is performed, the TWC upstream A/F drops below the stoichiometric air-fuel ratio. Meanwhile, the NSR upstream A/F is equal to the stoichiometric air-fuel ratio immediately after the start of the rich spike and drops below the stoichiometric air-fuel ratio after the rich spike has continued for a certain amount of time.

In addition, a period from the TWC upstream A/F dropping below the stoichiometric air-fuel ratio to the NSR upstream A/F dropping to a rich air-fuel ratio that is lower than the stoichiometric air-fuel ratio is assumed to be the first prescribed period. The first prescribed period may be a period in which the NSR upstream A/F is equal to the stoichiometric air-fuel ratio. Furthermore, a period in which the NSR upstream A/F is lower than the stoichiometric air-fuel ratio is assumed to be the second prescribed period. Alternatively, the first prescribed period may be from an air-fuel ratio of exhaust gas as detected by the first air-fuel ratio sensor 91 dropping below the stoichiometric air-fuel ratio to an air-fuel ratio of exhaust gas as detected by the second air-fuel ratio sensor 93 dropping to a rich air-fuel ratio that is lower than the stoichiometric air-fuel ratio.

Figure 9:
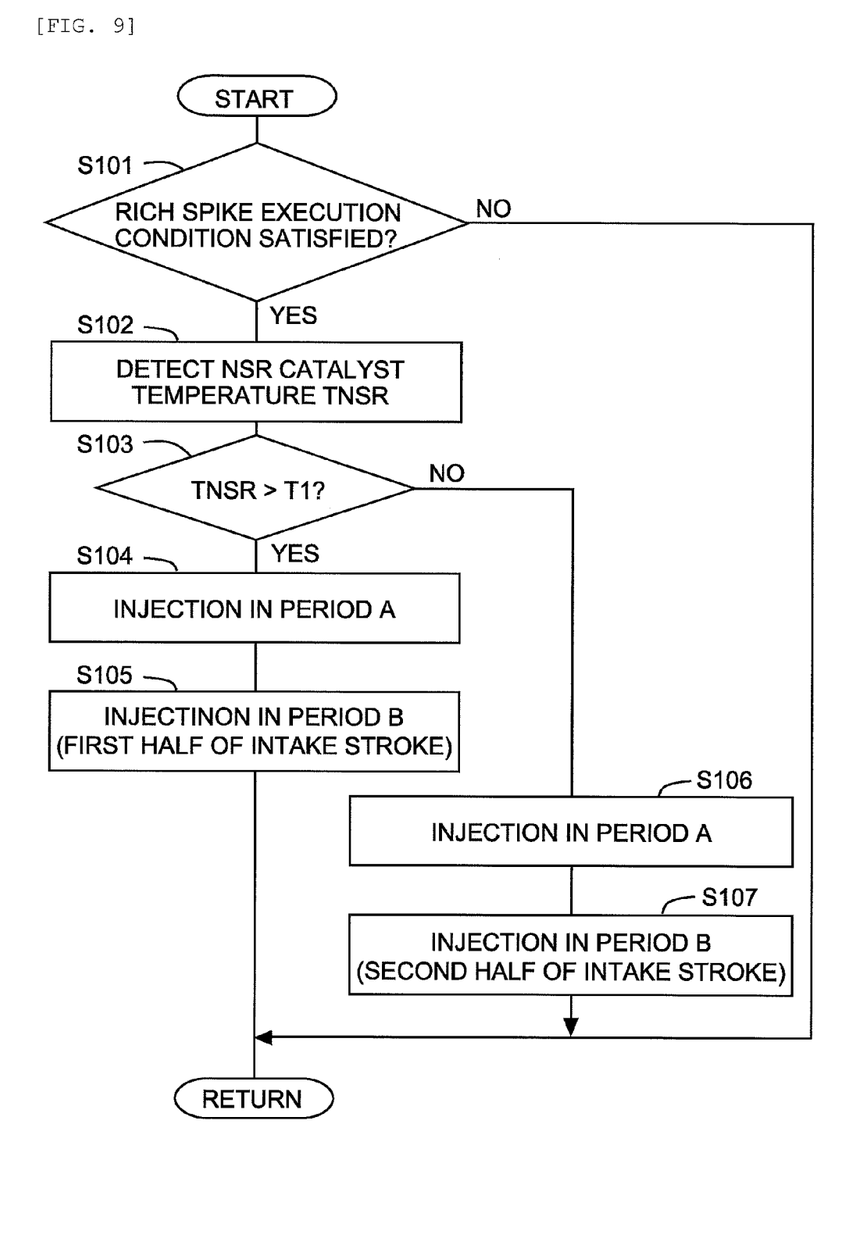
FIG. 9 is a flow chart showing a flow of generating $NH_3$ according to an embodiment.

FIG. 9 is a flow chart showing a flow of generating $NH_3$ according to the present embodiment. The present routine is executed every prescribed time by the ECU 10.

In step S101, a determination is made on whether or not an execution condition of a rich spike is satisfied. For example, a determination that the execution condition of a rich spike is satisfied is made when an operating state of the internal combustion engine 1 is a prescribed operating state suitable for generating $NH_3$. Alternatively, for example, a determination that the execution condition of a rich spike is satisfied may be made when it is necessary to supply $NH_3$ to the SCR catalyst 9. Alternatively, a temperature of the NSR catalyst 8 being an active temperature may be adopted as the execution condition of a rich spike. When a positive determination is made in step S101, the present routine advances to step S102, and when a negative determination is made, the present routine is ended.

In step S102, a temperature TNSR of the NSR catalyst 8 is detected. The temperature TNSR of the NSR catalyst 8 is obtained by the first temperature sensor 92. Subsequently, the present routine advances to step S103.

In step S103, a determination is made on whether or not the temperature TNSR of the NSR catalyst 8 is higher than a prescribed temperature T1. The prescribed temperature T1 is an upper limit value of a temperature at which an amount of $H_2$ generated due to an aqueous gas shift reaction is larger than an amount of $H_2$ generated due to a steam reforming reaction. The prescribed temperature T1 is determined by comparing FIGS. 2 and 3 with each other and may be set to a temperature between, for example, 500 degrees and 600 degrees. In the present step, a determination is made on whether or not the temperature of the NSR catalyst 8 is within the second prescribed range. When a positive determination is made in step S103, the present routine proceeds to step S104. Subsequently, in step S104, fuel injection in period A shown in FIG. 7 is performed. In other words, a rich spike is performed at a relatively low air-fuel ratio in order to release oxygen stored in the three-way catalyst 7. Subsequently, the present routine advances to step S105.

In step S105, fuel injection in period B shown in FIG. 7 is performed. In other words, a rich spike is performed at a rich air-fuel ratio but a relatively high air-fuel ratio in order to cause $NH_3$ to be generated at the NSR catalyst 8. In addition, in the present step, fuel injection from the in-cylinder injection valve 82 is performed in the first half of an intake stroke. Subsequently, the present routine is ended.

On the other hand, when a negative determination is made in step S103, the flow proceeds to step S106. Subsequently, in step S106, fuel injection in period A shown in FIG. 7 is performed. In other words, a rich spike is performed at a relatively low air-fuel ratio in order to release oxygen stored in the three-way catalyst 7. Subsequently, the present routine advances to step S107.

In step S107, fuel injection in period B shown in FIG. 7 is performed. In other words, a rich spike is performed at a rich air-fuel ratio but a relatively high air-fuel ratio in order to cause $NH_3$ to be generated at the NSR catalyst 8. In addition, in the present step, fuel injection from the in-cylinder injection valve 82 is performed in the second half of a compression stroke. Subsequently, the present routine is ended. Moreover, in the present embodiment, the ECU 10 that processes steps S103 to S107 corresponds to the control apparatus according to the present invention.

Moreover, while different air-fuel ratios are used for period A and period B in the present routine, alternatively, a same air-fuel ratio may be used for the entire rich spike. In addition, while a rich air-fuel ratio is realized by using the in-passage injection valve 81 and the in-cylinder injection valve 82 in combination in period A and period B, alternatively, a rich air-fuel ratio may be realized by only using the in-cylinder injection valve 82.

In addition, the first half of an intake stroke described above may be a period in which fuel injected from the in-cylinder injection valve 82 enters a range enclosed by the wall surface of the cylinder 2 and the outer circumferential surface of the piston 15 or may be a period between 340 degrees and 320 degrees before the compression top dead center. Furthermore, when injecting fuel from the in-cylinder injection valve 82 in the first half of an intake stroke described above, a timing of fuel injection may be determined so that, when fuel injected from the in-cylinder injection valve 82 strikes the wall surface of the cylinder 2, an outer edge of an upper surface of the piston 15 is positioned at a same height as the location struck by the fuel. Alternatively, when injecting fuel from the in-cylinder injection valve 82 in the first half of an intake stroke described above, a timing of fuel injection may be determined so that fuel injected from the in-cylinder injection valve 82 strikes the outer edge of the upper surface of the piston 15.

In addition, a timing of fuel injection from the in-cylinder injection valve 82 during $NH_3$ generation may be a period in which HC concentration or CO concentration is equal to or higher than a prescribed concentration. Furthermore, a timing of fuel injection from the in-cylinder injection valve 82 during $NH_3$ generation may be a period in which an amount of HC or an amount of CO is equal to or larger than a prescribed amount.

As described above, according to the present embodiment, by supplying a gas with higher reactivity to the NSR based on a temperature of the NSR catalyst 8, a larger amount of $NH_3$ can be generated using a smaller amount of fuel. Accordingly, $NH_3$ generation efficiency can be increased.

EXPLANATION OF REFERENCE NUMERALS AND CHARACTERS 1 internal combustion engine
2 cylinder
7 three-way catalyst
8 NOx storage reduction catalyst (NSR catalyst)
9 selective catalytic reduction NOx catalyst (SCR catalyst)
10 ECU
15 piston
31 intake pipe
32 intake port
41 exhaust pipe
42 exhaust port
81 in-passage injection valve
82 in-cylinder injection valve
83 spark plug
90 air flow meter
91 first air-fuel ratio sensor
92 first temperature sensor
93 second air-fuel ratio sensor
94 second temperature sensor
95 third temperature sensor
96 accelerator depression amount sensor
97 crank position sensor

The invention claimed is:

1. An exhaust gas purification apparatus of an internal combustion engine, comprising:
an $NH_3$ generating catalyst which is provided in an exhaust passage of the internal combustion engine and which generates $NH_3$ from NOx and $H_2$ when an air-fuel ratio of exhaust gas is lower than a stoichiometric air-fuel ratio;
a detector which detects a temperature of the $NH_3$ generating catalyst;
an in-cylinder injection valve which injects fuel into a cylinder of the internal combustion engine; and
a control apparatus configured to set the air-fuel ratio of exhaust gas lower than the stoichiometric air-fuel ratio to generate $NH_3$ by the $NH_3$ generating catalyst, wherein
the control apparatus is configured to, when setting the air-fuel ratio of exhaust gas lower than the stoichiometric air-fuel ratio, set a timing of fuel injection from the in-cylinder injection valve to a second half of a compression stroke in a case where the temperature of the $NH_3$ generating catalyst as detected by the detector is within a first prescribed range and set a timing of fuel injection from the in-cylinder injection valve to a first half of an intake stroke in a case where the temperature of the $NH_3$ generating catalyst as detected by the detector is within a second prescribed range that is a higher temperature range than the first prescribed range.

2. The exhaust gas purification apparatus of an internal combustion engine according to claim 1, further comprising an in-passage injection valve which injects fuel into an intake passage of the internal combustion engine, wherein
the control apparatus is configured to, when setting the air-fuel ratio of exhaust gas lower than the stoichiometric air-fuel ratio, set an amount of fuel injection from the in-passage injection valve to a fuel injection amount necessary for the air-fuel ratio to drop to the stoichiometric air-fuel ratio and set an amount of fuel injection from the in-cylinder injection valve to a fuel injection amount necessary for the air-fuel ratio to drop from the stoichiometric air-fuel ratio to a targeted rich air-fuel ratio.

3. The exhaust gas purification apparatus of an internal combustion engine according to claim 1, comprising a selective catalytic reduction NOx catalyst, which reduces NOx using $NH_3$ as a reducing agent, in the exhaust passage on a downstream side of the $NH_3$ generating catalyst.

4. The exhaust gas purification apparatus of an internal combustion engine according claim 1, wherein
the control apparatus is configured, when setting the air-fuel ratio of exhaust gas lower than the stoichiometric air-fuel ratio, to:
set the air-fuel ratio of exhaust gas lower than the stoichiometric air-fuel ratio by setting the timing of fuel injection from the in-cylinder injection valve to a second half of a compression stroke in a first prescribed period;
set air-fuel ratio of exhaust gas lower than the stoichiometric air-fuel ratio by setting the timing of fuel injection from the in-cylinder injection valve to a second half of a compression stroke in a second prescribed period that is a period subsequent to the first prescribed period and, at the same time, when the temperature of the $NH_3$ generating catalyst as detected by the detector is within a first prescribed range; and
set air-fuel ratio of exhaust gas lower than the stoichiometric air-fuel ratio by setting the timing of fuel injection from the in-cylinder injection valve to a first half of an intake stroke in the second prescribed period and, at the same time, when the temperature of the $NH_3$ generating catalyst as detected by the detector is within a second prescribed range that is a higher temperature range than the first prescribed range.

5. The exhaust gas purification apparatus of an internal combustion engine according to claim 4, wherein an air-fuel ratio of exhaust gas in the first prescribed period is lower than an air-fuel ratio of exhaust gas in the second prescribed period.

6. The exhaust gas purification apparatus of an internal combustion engine according to claim 4, further comprising:
a catalyst which is provided in the exhaust passage on an upstream side of the $NH_3$ generating catalyst and which has oxygen storage capability, and a gas sensor which is provided in the exhaust passage on a downstream side of the catalyst with oxygen storage capability and an upstream side of the $NH_3$ generating catalyst and which detects an air-fuel ratio of exhaust gas, wherein
the first prescribed period is at least a period from when an air-fuel ratio of exhaust gas on an upstream side of the catalyst with oxygen storage capability drops to below the stoichiometric air-fuel ratio to when the air-fuel ratio of exhaust gas as detected by the gas sensor drops to a rich air-fuel ratio that is lower than the stoichiometric air-fuel ratio.

* * * * *

UNITED STATES PATENT AND TRADEMARK OFFICE
CERTIFICATE OF CORRECTION

PATENT NO. : 9,605,616 B2
APPLICATION NO. : 14/897917
DATED : March 28, 2017
INVENTOR(S) : Kotaro Suzuki Page 1 of 1

It is certified that error appears in the above-identified patent and that said Letters Patent is hereby corrected as shown below:

In the Claims

At Column 18, Line 02, change "according claim 1" to "according to claim 1"

At Column 18, Line 11, change "set airfuel" to "set the airfuel ratio"

At Column 18, Line 19, change "set airfuel" to "set the airfuel ratio"

Signed and Sealed this
Fourth Day of September, 2018

Andrei Iancu
*Director of the United States Patent and Trademark Office*